(12) United States Patent
Rahn

(10) Patent No.: US 7,578,230 B2
(45) Date of Patent: Aug. 25, 2009

(54) BREWER DRY PLUG PREVENTION SYSTEM

(75) Inventor: Christopher W. Rahn, Virden, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 579 days.

(21) Appl. No.: 11/111,598

(22) Filed: Apr. 21, 2005

(65) Prior Publication Data
US 2005/0236431 A1 Oct. 27, 2005

Related U.S. Application Data

(60) Provisional application No. 60/564,012, filed on Apr. 21, 2004.

(51) Int. Cl.
*A47J 31/00* (2006.01)
(52) U.S. Cl. .......................................... 99/282; 99/281
(58) Field of Classification Search ................... 99/280, 99/281, 282, 283, 295, 302 R, 307
See application file for complete search history.

(56) References Cited

U.S. PATENT DOCUMENTS

| | | | | |
|---|---|---|---|---|
| 4,484,515 A | * | 11/1984 | Illy | 99/282 |
| 4,583,449 A | * | 4/1986 | Dangel et al. | 99/279 |
| 4,966,070 A | * | 10/1990 | Frisch | 99/302 R |
| 5,072,660 A | * | 12/1991 | Helbling | 99/280 |
| 5,868,062 A | * | 2/1999 | Enomoto | 99/282 |
| 6,003,435 A | | 12/1999 | Patel | |
| 6,685,059 B2 | | 2/2004 | Jones et al. | |
| 6,763,759 B2 | * | 7/2004 | Denisart | 99/302 P |
| 6,843,164 B2 | * | 1/2005 | Drobeck | 99/280 |
| 2003/0145736 A1 | | 8/2003 | Green | |
| 2005/0160918 A1 | * | 7/2005 | Winstanley et al. | 99/279 |
| 2006/0196363 A1 | * | 9/2006 | Rahn | 99/279 |
| 2007/0157820 A1 | * | 7/2007 | Bunn | 99/275 |

FOREIGN PATENT DOCUMENTS

WO   WO 01/72186   10/2001

\* cited by examiner

*Primary Examiner*—Reginald L Alexander
(74) *Attorney, Agent, or Firm*—Barnes & Thornburg, LLP

(57) ABSTRACT

A beverage making apparatus for producing a desired beverage using a heated brewing substance. The apparatus includes a system and method for preventing initiating of a heating cycle when an insufficient amount of water is retained in the apparatus. Additional features of the brewer are provided to facilitate movement of water through the system.

19 Claims, 3 Drawing Sheets

BREWER DRY PLUG PREVENTION SYSTEM

CROSS-REFERENCE TO RELATED PATENT APPLICATION

This patent application claims the benefit of U.S. Provisional Patent Application No. 60/564,012, filed Apr. 21, 2004. The disclosures set forth in the referenced provisional application are incorporated herein by reference in their entirety, including all information as originally submitted to the United States Patent and Trademark Office.

BACKGROUND OF THE INVENTION

A variety of brewing apparatus have been developed to combine heated water with a brewing substance such as ground coffee or tea material in order to infuse the material and produce a brewed beverage. There are many ways to combine the water with the brewing substance. One way is to place the substance in a filter device such as a disposable filter paper and place the filter paper and brewing substance in a brewing funnel or basket. The water is mixed with the brewing substance in the filter thereby allowing the brewed substance to filter through the paper leaving the saturated brewing substance in the filter paper. The saturated substance and used filter paper can be thrown away.

Another way of brewing beverage is to encapsulate the brewing substance in a filter material. The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed while packaging in the filter material or left in a generally loose condition. Pods are generally shaped in a circular shape having a generally flattened configuration. The pods often are provided in the shape of a disc or puck. Pods generally range in a size from approximately 45-60 mm and contain approximately 9-11 grams of brewing substance. The typical pod is used to produce approximately 8 ounces of brewed beverage.

By way of background, it may be detrimental to initiate a brewing cycle in a brewer when the heated water reservoir or tank is "dry." While the tank may not be totally devoid of water it may be so low that the result, the absence of water, is at least approximately the same as if the tank were dry. In this regard, such brewers include a reservoir which is used to retain a quantity of water which is heated and then subsequently used during a brewing cycle. It is detrimental to initiate a brewing process with a dry tank since it will cause the heating device or element of the tank to rapidly heat the air in the tank and possibly damage the heating element. In some situations, the heating element may be damaged during a single cycle when the level of water is sufficiently low or there is no water in the tank and, in other situations, perhaps, multiple heating cycles may be required before damage occurs. The reason for the generally rapid heating is that the empty or dry tank is a volume which merely contains air. Under normal operating conditions, this volume would contain water which would absorb the heat generated by the heating element. In contrast, when the tank is dry, the air rapidly heats, potentially resulting in damage to the heating element and possibly other system components.

As such, it is desirable to provide an apparatus, system and method for preventing a "dry plug" condition. In other words, it is desirable to prevent the system from initiating a heating cycle of the tank when an insufficient amount of water is retained in the tank after plugging in or providing power to the system. As such, it would be desirable to provide a system which prevents initiating a heating cycle when an insufficient amount of water is retained in the tank without control of the user such that it will prevent the user from damaging the apparatus.

BRIEF DESCRIPTION OF THE DRAWINGS

The organization and manner of the structure and function of the invention, together with the further objects and advantages thereof, may be understood by reference to the following description taken in connection with the accompanying drawings, and in which.

DETAILED DESCRIPTION

Figure 1:
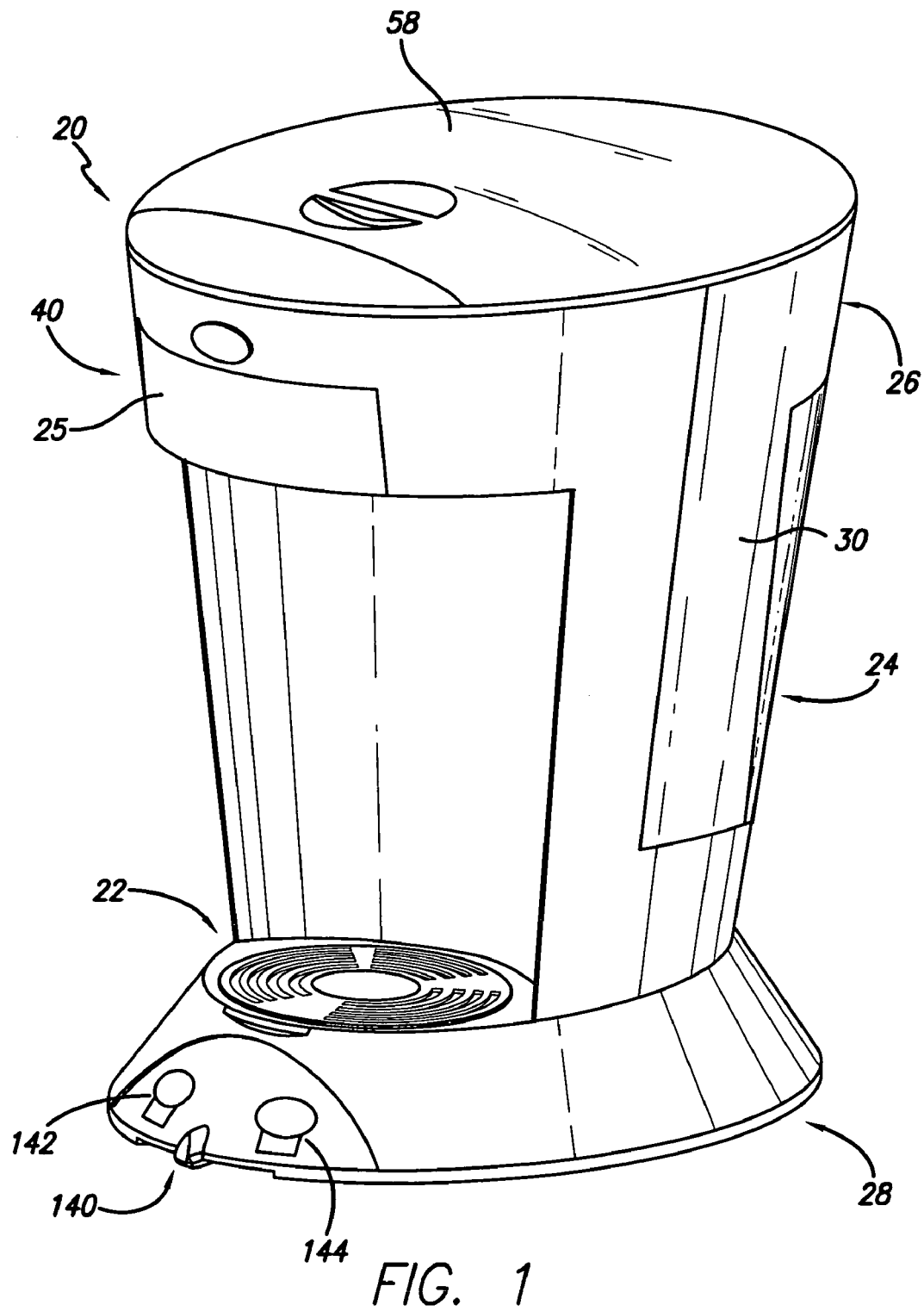
FIG. 1 is an illustration of a brewer which includes a dry plug prevention system.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Terms including brew, brewer, beverage and beverage making as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

While a "pod" is described herein, it is envisioned that any form of beverage making and/or brewing apparatus, beverage brewing substance device, holder, filter structure or other substance delivery media or vehicle may be used. It is envisioned that the present apparatus, system and method of operation could be utilized with other beverage making and dispensing apparatus which in addition to or substitution for brewing, the apparatus may use concentrates such as freeze dried concentrates, gel, liquid, powder or any other form of concentrate which will operate with the disclosed apparatus, system and method as well as equivalents thereof and any modifications which might be required to modify the apparatus, system and method to be used with such other substances, if necessary.

With reference to FIG. 1, a brewer or beverage dispenser 20 is shown. The brewer 20 includes a dispensing area 22 for placement of a container such as a cup or other vessel for dispensing a beverage therein. The brewer 20 includes a housing 24 having an upper portion 26 and a base portion 28. It should be noted that the brewer 20 could take any of many different appearances or housing designs and still be within the scope of the present disclosure. Further, while reference is made to a brewer which employs a "pod" or beverage dispenser is referred to herein, it should be understood that the disclosure as provided herein relating to an apparatus, method and system for controlling a brewer or dispenser may be usable with many other types of brewers and water heating devices which provide a reservoir or tank to retain a quantity of water for heating by any one of various heating apparatus or methods.

Figure 2:
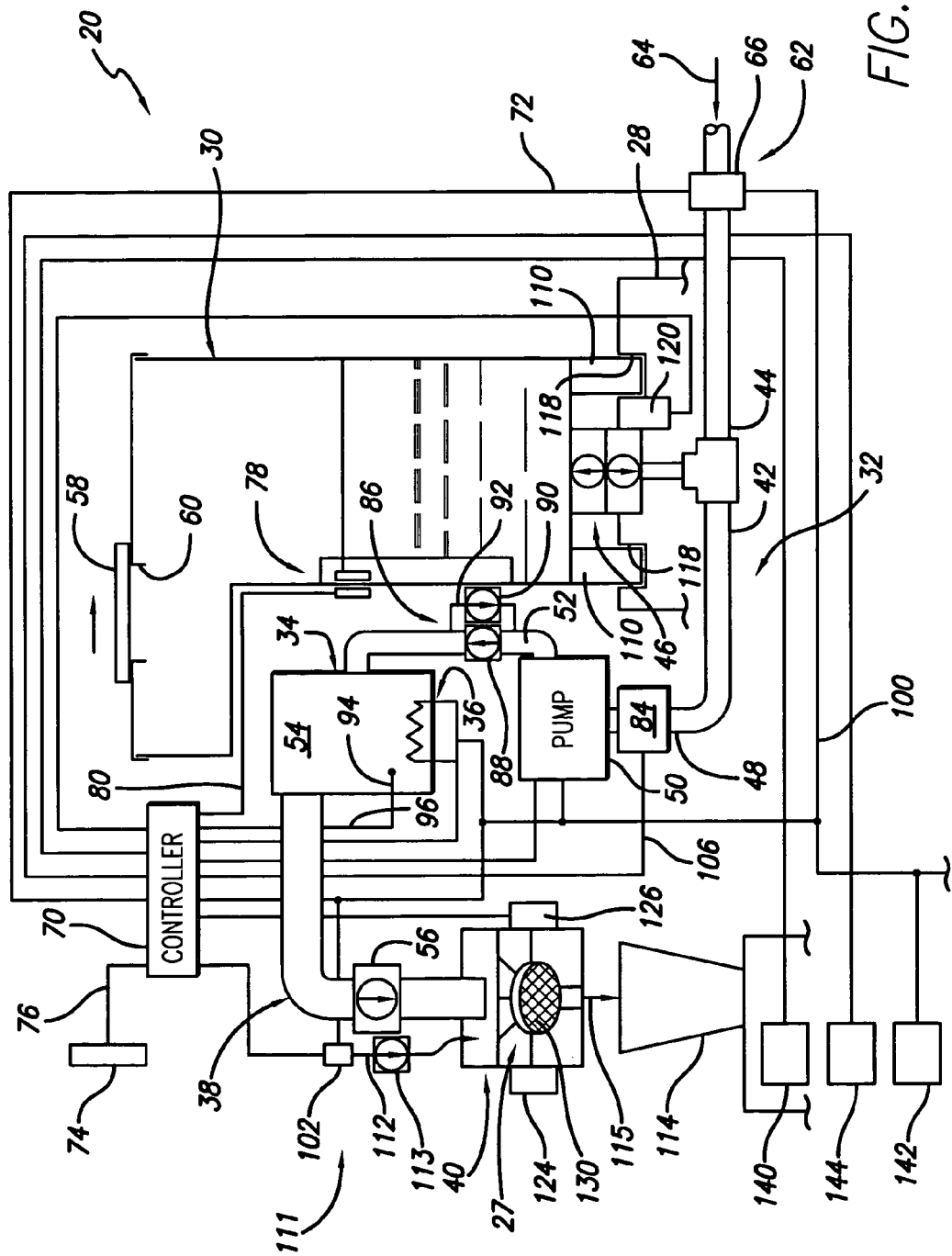
FIG. 2 is a general diagrammatic illustration of a schematic of the brewer as disclosed.

With reference to FIG. 2, the brewer 20 is shown in a diagrammatic form illustrating the mechanisms employed in the apparatus and used in conjunction with the system and method as disclosed herein. The brewer or system 20 includes a water reservoir 30 for retaining a quantity of water. The system includes a water delivery system 32 through which water is delivered to a heated water reservoir 34 for controllable heating by a heating element 36. It will be appreciated that other heating systems may be used to provide heat to the reservoir 34 and the contents of the reservoir, such as water. It is envisioned that the interpretation of the reservoir 34, heating device 36, water delivery system 32 and reservoir 30 will be broadly interpreted to include many different variations and embodiments of these components either alone or in combination with other components to achieve the objectives of the present disclosure. By way of further description, with reference to FIG. 2, water is heated in the heated water reservoir and dispensed through a water delivery line 38 to a beverage assembly 40. The beverage assembly 40 is configured in the form of a substance retaining drawer 25 which is selectably insertable on the upper portion 26 of the dispenser 20. The beverage assembly 40 includes a cavity 27 (for retaining a quantity of beverage substance 130). The beverage substance 130 is shown in FIG. 2 as a pod but may be any number of other beverage substances as noted herein.

The water delivery system 32 includes several components. An entry end 42 of a water supply line 44 is connected to a check valve assembly 46 between the reservoir 30 and the supply line 44. A pump feed end 48 of the water supply line 44 is spaced from the entry end 42 and connects to a pump assembly 50. The pump assembly 50 is illustrated as a gear pump of known construction. It is envisioned that other pumps may also provide the operation, function, apparatus and system as disclosed herein. The gear pump 50 will be referred to herein in the interest of continuity of this description. However, the reference to "pump" 50 should be broadly construed to include all other embodiments which function with the apparatus, system and method as disclosed and hereafter developed to provide the pumping.

The pump 50 generally provides a positive pumping action on water supplied from the reservoir 30 via the supply line 44. Water pumped from the pump assembly 50 is moved through an inlet line 52 to the heated reservoir 34. The heated reservoir 34 defines a cavity 54 which retains a quantity of water for heating by a heating device or element 36. Water is passed from the heated reservoir 34 through the water delivery line 38 as described above. Water delivery line 38 includes a check valve 56.

With references to FIGS. 1 and 2, a displaceably slidable lid 58 is provided for revealing an opening 60 for dispensing water into the reservoir 30. Water may also or alternatively be introduced into the reservoir by a plumbed connection 62 which provides pressurized water 64 through the supply line 48 through the check valve system 46 to the reservoir. Pressurized water 64 entering the supply line 44 is resisted by the pump assembly 50 when the pump 50 is not operating. The check valve assembly 46 allows passage of water into the reservoir 30 and subsequent dispensing of water from the reservoir 30. A controllable valve 66 is attached to the supply line 44 and coupled to a controller 70 via line 72. The controller 70, as will be described in greater detail hereinbelow, controls the opens and closes the valve in response to signals from a control panel 74 or other input device, also coupled to the controller over line 76. Additionally, in this embodiment, water level sensor assembly 78 can be provided in association with the reservoir and coupled to the controller 70 over line 80. When the water level sensor assembly 78 indicates a sufficient level of water in the reservoir 30, the controller 70 operates the valve 66 to a closed position to cease filling of the reservoir 30. Other forms of level sensors may be used and are fully within the scope of the present disclosure, including resistive, capacitive, optical, and sonic, as well as any other form of level sensing device coupled to the controller 70.

Also included in the apparatus and system is a flow meter 84 and check valve assembly 86. The check valve assembly 86 includes at least one check valve and possibly two check valves 88, 90. One check valve 88 communicates with the inlet line 52. A second check valve 90 is connected to a side routing line 92. This check valve system 86 facilitates movement of water from the pump assembly 50 to the heated reservoir 34 through the first check valve 88. In a system which employs the second check valve 90, some degree of flow is allowed to return through the side routing line 92 from the heated reservoir 34 to the pump 50 through check valve 90. The operation of the check valve assembly 86 facilitates the release of some degree of pressure downstream of the pump 54 when a brewing cycle ends. However, this check valve assembly 86 also prevents the heated water reservoir 34 from completing draining.

Additionally, the flow meter 84 provided in the water delivery system 32 is positioned on the cold or unheated side of the heated water reservoir 34 and pump so as to prevent the accumulation of lime in the flow meter 84. The flow meter 84 is coupled to the controller 70 over line 106. In other words, the flow of water flowing through the line 44 and the flow meter 84 has not been heated. In a heated water system, lime and other mineral deposits may tend to form on elements in the heated section or downstream of the heated section. Since lime is discouraged from developing by placing the flow meter 84 on the cold water, or upstream, side of the water delivery system 32, the accumulation of lime and other minerals is discouraged and, therefore, does not require or may require less cleaning. By eliminating or reducing the accumulation of lime, the reliability of the system increases and the maintenance associated with the system decreases. The flow meter 84, while shown positioned between the inlet line 44 and pump 50, may alternatively be positioned between the pump 50 and the reservoir 34 and maintain the benefits as described.

A thermostatic sensor 94 is positioned inside the heated water reservoir 34 and coupled over line 96 to the controller 70. The controller 70 obtains information from the thermostat 90 and controls operation of the heating element 36 in response thereto.

The system includes a power connection 100 which is coupled to various elements including, but not limited to, the controllable valve 66, pump assembly 50, air purge 102, heating element 36, and controller 70. Power can be provided through power delivery systems of known construction to other components and systems and subassemblies where a power source is needed. The power may be provided directly to the components or may be provided in low voltage DC form by use of an appropriate power transformer. For example, while the heating element or heating device 36 may be provided with power which has not been stepped down or transformed, the other elements may operate at a lower voltage such as 12V DC in the interest of control, efficiency and reliability.

The controller 70 is also coupled to the flow meter 84 over line 106. The controller operates as a system that controls the operation of the brewer and prevents a "dry plug" condition. A dry plug condition occurs when power is provided to the heating element 36 in advance of the placement of water or at least a sufficient quantity of water into the heated reservoir 34. The dry plug condition can result in potential damage or unnecessary wear to the system and can be controlled by the controller 70 in accordance with the description herein and the teachings of the method, apparatus and system herein. The controller 70 can also be configured to acknowledge various calibration steps for certain operations when the brewer 20 is first energized. In other words, after initial assembly of the brewer 20, the controller 70 is configured to recognize when it is first being powered up or when the brewer is powered up after being turned off or not used for an extended period of time.

For example, when a user purchases a brewer employing the present disclosed apparatus and system and method of operation, the controller 70 will recognize that the brewer is plugged in or energized for the first time and that it has not been previously used. This configuration of the controller 70 may also occur by an automatic reset which will occur when the brewer 20 is unplugged or de-energized for a predetermined period of time. After satisfying the predetermined period of time, the brewer will switch over to a "new" or unplugged condition. In this situation, the controller essentially resets as if it were a new brewer requiring the user to recalibrate the system. This requirement for calibrating when it is first used or recalibrating when it has not been used for an extended period of time helps to reduce problems associated with the absence or reduction of water which may occur when the brewer is first being set up for use and after an extended period of time in which it has not been used. Further, the controller 70 can be programmed to time out to shut off the heating element after a predetermined period of time, for example days, weeks or months to prevent excessive evaporation of water in the reservoir.

Using the apparatus, system and method as disclosed, once the controller 70 is powered up via power source 100, the controller 70 will monitor operation of the flow meter 84 to detect a predetermined number of counts or metering counts. The number of counts relates to the quantity or volume of water which is pumped by the pump 50 to fill the heated reservoir 34 to a desired level. By monitoring the number of counts or volume of water that is pumped, the heated water reservoir will be filled to a sufficient level to allow heating of the water in the tank. If the counts are not monitored, the tank will not have a sufficient quantity of water before the heating element 36 is activated, and thus, there may be a risk to damaging the heating element 36, reservoir 34 or other components of the system. Also, if the pump 50 does not function the flow meter 84 will sense no counts and the system will prevent heating of the reservoir 34.

By monitoring the flow meter 84 for a predetermined number of counts, a predetermined quantity of water will be placed in the heated water reservoir 34 before the heater 36 is activated. If a sufficient number of counts are not detected, the controller 70 will prevent activation of the heater 36. If a sufficient number of counts of the flow meter 84 have been detected, the controller 70 will permit activation of the heater.

Once a predetermined number of counts are detected by the controller 70, the system will be available to brew beverage, the pump will be allowed to continue to operate to deliver water to the hot water tank and to displace hot water in the tank. It should be noted that a threshold criteria in addition to the number of flow meter 84 counts is to monitor the temperature of the water in the heated water reservoir 34. Once the temperature of the water in the reservoir 34 has reached a desired brewing temperature as detected by the thermostatic sensor, the pump 50 will then be allowed to continue to operate and pump water from the inlet line 44 to displace water from the reservoir 34 to displace heated water from the reservoir 34 for the brewing cycle in combination with the temperature of the water in the reservoir and/or the operation of the flow meter 84.

Figure 3:
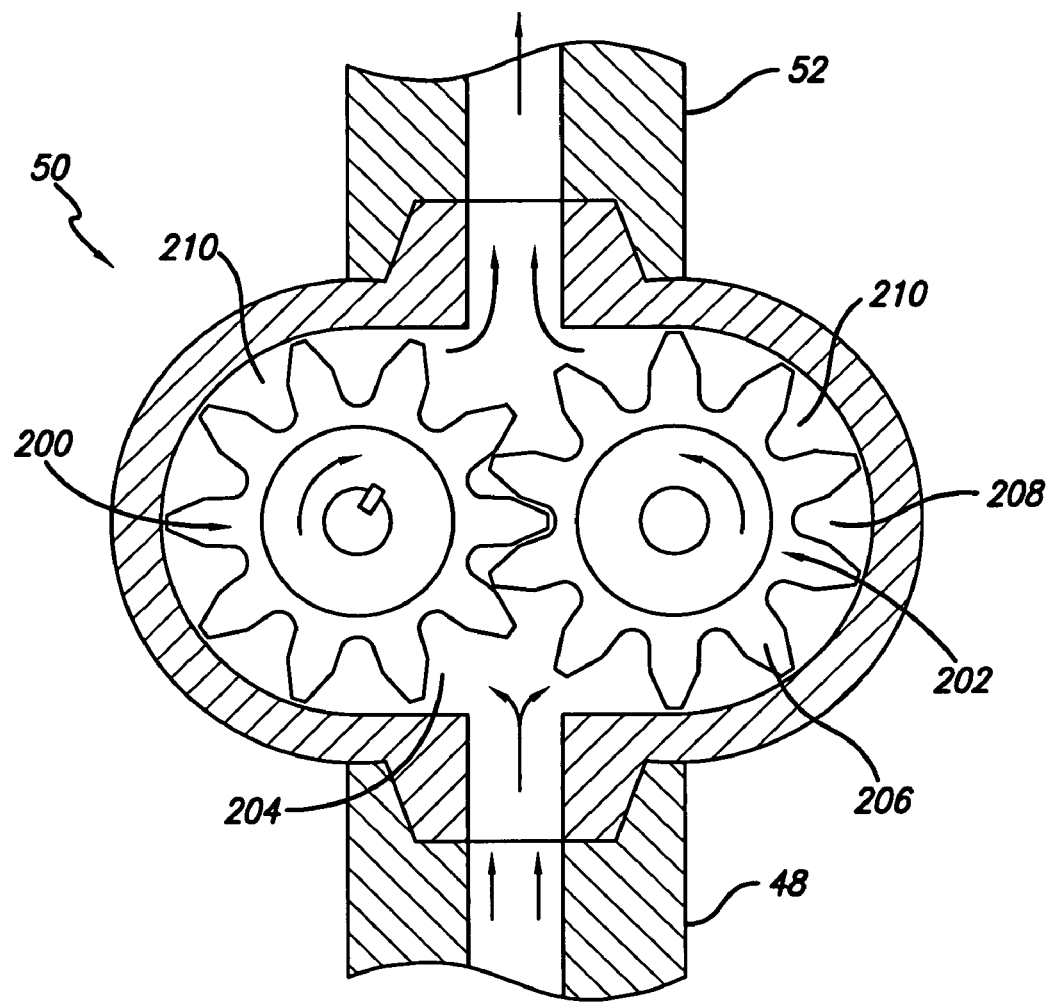
FIG. 3 is a general diagrammatic illustration of a gear pump as used in one embodiment as disclosed.

In this regard, a generally known quantity of water is pumped by the pump 50 in a given period of time. This information can be used in combination with the assumption that water is flowing through the line 44 to the pump 50 to operate the pump 50 for a predetermined number of cycles which translates into a predetermined quantity of water being dispensed into the reservoir 34. In this regard, the pump 50 can be in the form of the gear pump as shown in FIG. 3 or in the form of other types of suitable pumps, such as piston operated pumps, peristaltic pumps or other systems that may be devised for suitable use with such a brewing system.

In use, once the system is activated the pump 50 will be operated in response to instructions from controller 70 for a predetermined time based on the number of cycles detected by the flow meter 84. If a predetermined number of cycles has been detected the heater will be activated. If other conditions are detected the system may activate an alert by way of controller 70 to the corresponding display/control panel 74. The display may be visual, auditory or any other means for reporting the condition.

Additionally, it is envisioned that the dry plug method may be employed in a system which provides line fed water through the line 44 without the use of a pump. In this regard, the system may operate to fill the reservoir 34 using line pressure water 64. In this situation, the flow meter 84 can monitor the flow of water into the reservoir 34 and provide confirmation when a sufficient quantity of water has been dispensed into the reservoir 34 to safely allow activation of the heater 36.

Also coupled with the water delivery system 32 is a purging assembly 111. The purging assembly 111 includes the controllable air pump 102 coupled to the controller 70. In use, at the end of a brewing cycle, the controller 70 operates the air pump 102 to provide a purging volume, flow or pulse of air through an air line 112. The air line 112 communicates with the delivery line 38 or the beverage assembly 40. A check valve 113 is provided on the line 112 to prevent backflow from the beverage assembly 40. When air is pumped through line 112, remaining water in the pod 130 is moved out of the beverage assembly 40 and into the cup 114. By purging or moving air through the line and into the line 112 and into the beverage assembly 40 the air helps displace and remove excess water on top of the pod 130 that remains in the beverage assembly or drawer. This helps prevent complications when removing the pod 130 from the assembly 40. Additionally, the air purging helps insure most of the water in the pod is removed so that the beverage or coffee 115 dispensed into the cup 114 has the benefit of all of the possible flavor components and materials available during a brewing cycle. Further, the air purge helps remove or clear remaining brewing or coffee products such as oils and particulate matter which might be otherwise be retained in the beverage assembly 40. This removal helps to minimize or eliminate flavor transfer to the next brewing substance used in the next brewing cycle.

The reservoir 30 can be configured to be removable from the housing 24. At least one, and possibly a plurality of locating legs 116 are provided at the lower portion 28 of the reservoir 30. The legs 116 engage corresponding receptacles 118 on the corresponding portion of the housing 28. In this regard, the legs 116 engage the receptacles 118 to help positively locate the reservoir 30 relative to the check valve system 46. This helps to engage the check valves to provide proper operation of the check valve system. Additionally, a reservoir detecting sensor assembly 120 is was provided with the reservoir 30 and housing 24. The sensor assembly 120 includes a device carried on the reservoir 30 and the housing 24 for detecting proper placement of the reservoir on the housing. The sensor assembly 120 is coupled to the controller 70 for operation as described in further detail below.

Also provided on the brewing assembly 20 is a mechanical or other form of a lock or retaining system 124 and an assembly detecting sensor 126. The assembly detecting sensor 126 indicates whether the conditions of the sensor permit brewing through the brewing assembly 40. The sensor 126 is coupled to the controller 70. Also provided on a user accessible control panel are a selectable control 140, a power switch 142 and a brew cycle activation control 144. The power switch 142 activates and deactivates the power to the system to turn the system on and off. The power system may be located on the front or any other location which is deemed suitable for operation of the brewer 20. The selectable control 140 allows a user to select a quantity of liquid to be dispensed during the brewing cycle. The quantity of water has an effect on the flavor and characteristics of the brewed beverage as well as adjusting the volume of water. The brew cycle activation switch 144 allows a user to set up all the various components for a brew cycle including the brewing substance 130 and cup 114 and then activate the switch 144 to initiate the brewing cycle.

With reference to the operation of one embodiment of the drawer 25 of the beverage assembly 40 as referred to hereinabove can be found in related provisional application entitled "Apparatus System and Method for Retaining Beverage Brewing Substance" filed Feb. 9, 2005, application Ser. No. 11/055,411. Additional information relating to the adjustable control 140 can be found in related provisional application entitled "Adjustable Volume Brewer" filed Nov. 5, 2004, U.S. application Ser. No. 04/037,106. Additional information related to the spray head system 27 and method for delivering water to the brewing assembly 40 can be found in U.S. Provisional Application entitled "Water Delivery System, Method and Apparatus" filed Nov. 8, 2004, application Ser. No. 10/983,466. Each of the above-referenced applications and the materials set forth therein is incorporated herein in its entirety by reference.

In use, the user dispenses a quantity of water into the reservoir 30 through the opening 60 or the reservoir 30 is automatically filled by the plumbed line 62 receiving line pressure from the facility plumbing. Upon placement of a brewing substance 130 in the brewing assembly 40, the system checks to determine if the detection sensor 126 senses a closed brewing assembly 40. If the controller 70 obtains appropriate information indicating that the brewing assembly 40 is, in fact, closed, the brewing cycle will be allowed to proceed. If the controller 70 detects that the brewing assembly 40 is not closed, the process will be stopped and some form of indicator or other indicia may be provided on display 74 coupled to the controller 70. Assuming that the assembly 60 is closed or that any indicated error has been resolved, the brewing cycle continues.

Proceeding with the brewing cycle during an initial set-up, the controller 70 will operate in one of the ways described hereinabove to provide some water to the heated water reservoir 34 before activating the heater 36. In this way, the system 20 prevents a "dry plug" condition in which the plug or power source 100 can provide power to the controller but is prevented from activating the heater 36 until the desired quantity of water has been dispensed into the heated water reservoir 34.

This filling of the heated water reservoir 34 is different than other systems which rely upon level sensing devices positioned in the reservoir. By use of the controller 70 to operate and monitor conditions of related components, there is no need to provide a level sensing device and the associated issues related to maintenance, wear, reliability and cost. Once the system has satisfied the initial fill condition of the heated water reservoir, the heater 36 can be energized to heat the water contained therein subject to additional filling provided by the line 44 and pump 50.

The brewing process then continues with the initiation of the operation of the pump 50 as controlled by the controller 70 to pump a desired quantity of water through the heated water reservoir 34.

Pumping of water into the heater assembly 34 results in displacing heated water from the reservoir 34 through the water delivery line 38. Alternatively, the heating assembly 34 can start with preexisting temperature and heat the liquid to a desired temperature as sensed by the thermostat 94. Either way, the controller 70 operates the pump 50 for a pre-determined period of time relating to a quantity or volume of water which is to be dispensed to the brewing assembly 40 to produce a desired quantity of brewed beverage. Additionally, the pump 50 can be intermittently controlled to dispense several smaller quantities of water totaling the total volume of water for brewing throughout the brewing cycle to produce a desired brewing result.

During the brewing process, water flows through the water delivery line 38 and into the brewing assembly 40. At the conclusion of the brewing cycle, operation of the pump 50 is ceased whereby the check valve assembly 56 prevents continued flow of water into the pump assembly 50. It should be noted, however, that if the embodiment of the brewer includes the valve assembly 86, some back flow of water from the heater assembly 34 into the pump 50 may occur without draining the heated water tank. The check valve 88 on the water delivery line 52 allows water to flow through during the pumping process but prevents continued flow at the end of the pumping process. The purge assembly 110 is operated at the end of the pumping cycle to push a volume of air through the associated water delivery line 38 and through the corresponding brewing assembly 40. This helps to purge liquid in the brewing substance 130 and prevent dripping from the brewing assembly 40 at the end of the brewing cycle.

If the brewing assembly 40 is opened, the sensor 126 senses this change and stops the brewing cycle. This helps minimize the quantity of water being dispensed through the water delivery system 32.

Additionally, at the end of a brewing cycle, the controller 70 will detect whether the sensor 126 has been cycled. This is useful to detect whether the pod 130, which has been used in the previous brewing cycle, has been removed from the assembly 40. If the sensor 126 has been cycled, the controller 70 will assume that the pod has been removed. If the controller 70 does not detect cycling of the sensor 126, it will assume that the pod has not been removed, prevent the start of a brew cycle, and provide some indicia at the display 74 to indicate to the user that the brew pod needs to be changed. The indicia provided at the display 74 may be in the form of lights, audio responses, visual displays or any other form of indicia which will indicate the status, operation or other related information associated with the brewer 20.

An example of the gear pump 50 as used in the present disclosure might be the type as provided in B&D Pumps, Inc. of Huntley, Ill. Such gear pumps include, for example, a driving gear and a driven gear 200, 202. The pumps rotate and operate as shown diagrammatically in FIG. 4. The supply line 44 supplies water to the pump, whereupon it is moved by rotation of the driving gear and driven gear 200, 202 to create an output pressure in the inlet line 52.

The gears 200, 202 come into and out of mesh to produce flow. The driving gear 200 is operated by a controllable motor coupled to the controller to provide a positive drive. Once the gears 200, 202 come out of mesh they create an expanding volume on the inlet side 48 of the pump. Liquid flows into the cavity 204 and is trapped by the gear teeth 206 as they rotate. Liquid travels around the interior of the housing 208 in pockets 210 formed between the teeth 206 and the housing 208. The releasing of the gears on the outlet side 52 tends to force liquid through the outlet port under pressure. Such gear pumps generally provide a constant displacement such that flow is at least generally proportional to the RPM of the drive gear. In one embodiment, the pump 50 is placed at a position which is generally lower than the volume or head of the reservoir 30 to provide a priming action on the pump 50. The head in the reservoir or line pressure from the inlet line provides positive pressure on the pump to prime it for a brew cycle. While the gear pump 50 is a suitable choice, other pumps may be substituted. Gear pumps may be preferable for some applications because they are relatively quiet and provide long life at an affordable component price range.

One of the advantages of a gear pump (as shown and described herein) is that when the pump is stopped, pressure from the heater assembly 34 such as from expansion water from the tank is allowed to bleed off through the pump 50. This bleeding-off helps to reduce the drip out by reducing the positive pressure at the water delivery line 52 such that the pressure tends to flow back through the gear pump and into the reservoir 30.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure as set forth in the claims.

The invention claimed is:

1. A beverage dispenser comprising:
   a water delivery system;
   a reservoir operatively associated with the water delivery system;
   a heater operatively associated with the reservoir for heating water received in the reservoir;
   a pump coupled to at least one of the reservoir and the water delivery system;
   a flow meter operatively associated with at least one of the pump, reservoir and water delivery system;
   a controller coupled to the flow meter, pump and heater for controllably operating the dispenser to prevent heating of water unless predefined conditions are satisfied; and
   wherein the flow meter detects flow through the water delivery system and provides a signal to the controller, the controller preventing operation of the heater until a predetermined volume of water is detected by the flow meter to prevent activation of the heater until sufficient water volume is received by the reservoir.

2. The beverage dispenser of claim 1, wherein the water delivery system includes an entry end, the pump and flow meter being positioned between the entry end and the reservoir.

3. The beverage dispenser of claim 2, wherein the flow meter is positioned between the entry end and the pump.

4. The beverage dispenser of claim 1, wherein the heater is operatively associated with at least one of the reservoir and the water delivery system.

5. The beverage dispenser of claim 4, wherein the heater is at least partially retained in the reservoir for heating water retained in the reservoir.

6. The beverage dispenser of claim 1, including a connection for coupling a pressurized water source to the water delivery system.

7. The beverage dispenser of claim 6, further comprising a controllable inlet valve coupled to the controller for controlling the flow of pressurized water into the water delivery system.

8. The beverage dispenser of claim 1, including an unheated water reservoir selectively coupleable to the water delivery system.

9. The beverage dispenser of claim 8, further comprising a reservoir detecting assembly coupled to the controller, the reservoir detecting assembly detecting at least one of the presence and absence of the reservoir on the dispenser.

10. The beverage dispenser of claim 1, further comprising a connection to a power source, the connection coupled to the controller for indicating to the controller when the power is turned on and off, the controller being reset to upon turning on the power to detect the flow of water in the dispenser for preventing heating prior to detecting sufficient flow.

11. A beverage dispenser comprising:
   a water delivery system;
   a connection for coupling the water delivery system to a pressurized water source;
   a reservoir operatively associated with the water delivery system;
   a heater operatively associated with the reservoir for heating water received in the reservoir;
   a flow meter operatively associated with the water delivery system;
   a controller coupled to at least the flow meter and heater for controllably operating the dispenser to prevent heating of water unless predetermined volume of water is detected by the flow meter; and
   wherein the flow meter detects flow through the water delivery system and provides a signal to the controller, the controller preventing operation of the heater until a predetermined volume of water is detected by the flow meter to prevent activation of the heater until sufficient water volume is received by the reservoir.

12. The beverage dispenser of claim 11, further comprising a pump coupled to at least one of the reservoir and the water delivery system for moving water through the dispenser.

13. The beverage dispenser of claim 11, further comprising the heater being operatively associated with at least one of the reservoir and the water delivery system.

14. The beverage dispenser of claim 13, wherein the heater is at least partially retained in the reservoir for heating water retained in the reservoir.

15. The beverage dispenser of claim 11, wherein the water delivery system includes an entry end, the flow meter being positioned between the entry end and the reservoir.

16. The beverage dispenser of claim 12, wherein the water delivery system includes an entry end, the pump and flow meter being positioned between the entry end and the reservoir.

17. The beverage dispenser of claim 16, wherein the flow meter is positioned between the entry end and the pump.

18. The beverage dispenser of claim 11, further comprising a controllable inlet valve coupled to the water delivery system and coupled to the controller for controlling the flow of pressurized water into the water delivery system.

19. A beverage dispenser comprising:
a water delivery system;
a reservoir operatively associated with the water delivery system;
a heater operatively associated with at least one of the reservoir and the water delivery system for heating water in the at least one of the reservoir and the water delivery system;
a flow meter operatively associated with at least one of the reservoir and water delivery system;
a controller coupled to the flow meter and heater for controllably operating the dispenser to prevent heating of water unless predefined conditions are satisfied; and
wherein the flow meter detects flow through the water delivery system and provides a signal to the controller, the controller preventing operation of the heater until a predetermined volume of water is detected by the flow meter to prevent activation of the heater until sufficient water volume is received by the at least one of the reservoir and water delivery system.

\* \* \* \* \*